United States Patent [19]

Christiansen et al.

[11] 4,257,240
[45] Mar. 24, 1981

[54] CONTAINER REFRIGERATION UNIT

[75] Inventors: David A. Christiansen, Bloomington; Kevin W. Kiefer, Eden Prairie; Lowell B. Naley, Minnetonka; Ronald W. Seipp, Apple Valley; Lawrence J. Shirek, Minneapolis; Robert L. Harrington, Eden Prairie, all of Minn.

[73] Assignee: Thermo King Corporation, Minneapolis, Minn.

[21] Appl. No.: 79,014

[22] Filed: Sep. 26, 1979

[51] Int. Cl.³ .................. F25D 19/02; F25D 15/00; B60H 3/04; F25D 23/00
[52] U.S. Cl. ........................ 62/448; 62/237; 62/239; 62/302
[58] Field of Search .............. 62/448, 237, 239, 302

[56] References Cited

U.S. PATENT DOCUMENTS

| | | | |
|---|---|---|---|
| 3,199,579 | 8/1965 | Foster et al. | 62/448 X |
| 3,973,939 | 8/1976 | Abbott | 62/448 |
| 4,182,134 | 1/1980 | Viegas et al. | 62/448 |

Primary Examiner—Lloyd L. King
Attorney, Agent, or Firm—E. C. Arenz

[57] ABSTRACT

A transport refrigeration unit for a transport container in which the refrigeration unit has side-by-side evaporator and condenser compartments 18 and 20 in the upper portion of the exterior frame, with a power compartment 24 extending across the entire width of the lower portion of the unit, the power compartment containing an internal combustion engine 26, a motor-alternator 28 and a refrigerant compressor 30 in in-line relationship, a radiator coil 62 condenser coil 64 being in inclined disposition in the condenser compartment and receiving air therethrough from condenser fan 66, the evaporator coil 72 being inclined in the evaporator compartment and in a disposition in which a portion of the coil projects out of the plane of the rear face of the frame, and a pair of double inlet centrifugal fans 74 are provided in the upper portion of the evaporator compartment to draw air from the upper part of the container and direct it downwardly through the coil 72 back into the container, and separate panels 36 and 40 are provided for the evaporator and condenser compartments for individual access, the evaporator panel including an adjustable vent plate 38 for controlling the exchange of air between atmosphere and the container interior.

7 Claims, 5 Drawing Figures

CONTAINER REFRIGERATION UNIT

BACKGROUND OF THE INVENTION

This invention pertains generally to the art of transport refrigeration units and in particular to that part of the art relating to such units adapted for use on freight containers which may be transported by truck, train or ship.

A refrigeration unit according to our invention has various features believed to be superior to prior art units used in the same type of service. While some of these features have been available individually with particular prior art units, no prior art units of which we are aware has all of these features available in one package As background for better understanding the desirability of some of these features, a brief discussion of the type of service to which sea-going refrigeration freight containers are subject, and the relationship of this service to the refrigeration unit, is considered in order.

These freight containers are in the form of large, thermally insulated boxes which may be stacked on the deck of container ships for ocean travel, and may be transferred thereto or therefrom to a train flat car, or a truck trailer chassis for land transport. Because of such handling, such containers are typically constructed with a pocket or recess at the front of the container to receive the refrigeration unit, which should fit within the pocket without projecting beyond it, thereby to avoid damage to the refrigeration unit in handling of the freight container. To provide flexibility in the transport mode (ship, train, truck) it is desirable that the refrigeration unit be adapted to be powered either electrically, or by an internal combustion engine. Since not only the refrigeration compressor requires power, but also means must be provided to drive evaporator and condenser fans, it is considered desirable if possible to use motors to drive these fans to avoid maintenance problems experienced with fan belt drives that are driven from the prime mover.

Continuing with the characteristics desirable in such a refrigeration unit, obviously the unit should have adequate refrigeration (and heating) capacity to maintain the proper temperature in the container, regardless of whether the container is being transported through desert heat or is in some more moderate climate. Since the container may be transported on deck of ships, which may encounter heavy seas at times, then it should also be constructed in a manner that is not likely to fail under such conditions. At the same time, since most man-made objects are subject to failure, the arrangement and construction of the unit should be such that service upon it is not unduly difficult, even though it may be at the top of a stack of container units aboard a ship encountering heavy weather. Finally, another important consideration is that the container owner desires that the refrigeration unit take up as little internal space in the container as possible so as to maximize the available cargo space.

It will be appreciated by those familiar with the refrigerated container art that these considerations, along with others not here mentioned, are not all easily obtained in a single unit, since some of these considerations and desirable characteristics impact upon each other. In other words, certain features may be available only at the expense of other desirable features. However, we believe that a unit according to our invention yields a reasonably good balance of the major ones of the desirable characteristics, and is a unit eminently suited for its intended service on a refrigerated container.

SUMMARY OF THE INVENTION

A transport refrigeration unit according to our invention is so arranged and constructed as to be adapted to be mounted on the front wall of a transport container for conditioning the interior of the container and extends for substantially the total width of the pocket provided at the front of the container. The unit comprises a generally rectangular outer frame having an intermediately located, vertically disposed partition means separating the upper part of the frame into side-by-side evaporator and condenser compartments, with partition means defining the bottom of the evaporator compartment and separating it from a power compartment below both the evaporator and condenser compartments and extending for the width of the unit, the power compartment containing a power package including an internal combustion engine, an electric motor-alternator and a refrigerant compressor in in-line relation, with the power compartment being in substantially open communication with the bottom of the condenser compartment, the condenser compartment containing a radiator coil for the engine and a refrigerant condenser coil, the evaporator compartment having a refrigerant evaporator coil in it with the coil having a material portion of it forward of the plane of the rear face of the frame and the remaining portion of the coil projecting out of the plane of the rear face of the frame, the evaporator compartment also having evaporator fan means in the upper part of the compartment for moving air to be conditioned into the evaporator compartment from the container interior, through the evaporator coil and back into the container interior, the condenser compartment including condenser fan means for creating a flow of air from atmosphere through the radiator condenser coils, into the power compartment and from there back to atmosphere, the unit also including panel means covering the front face of the evaporator and condenser compartments, the panel means including a condenser air inlet, and thermal insulation carried by the panel means for insulating the front face of the evaporator compartment.

In the currently preferred arrangement of the unit according to our invention the evaporator coil is disposed in the lower part of the evaporator compartment in a tilted inclination with its upper edge part projecting out of the plane of the rear face of the frame of the unit and the evaporator fan means comprise a pair of double inlet, centrifugal fans in the upper part of the evaporator compartment to draw air in from the upper part of the container and discharge it downwardly through the evaporator coil. The condenser coil and radiator coil are both disposed in an inclined disposition in the condenser compartment and the condenser fan means comprises a propeller fan in the upper part of the condenser compartment and located adjacent the condenser air inlet.

Other features in the preferred form of the unit will be set forth hereinafter.

DESCRIPTION OF THE PREFERRED EMBODIMENT

While the description of the transport refrigeration unit will proceed in connection with its refrigeration function, it will be understood that these types of units are frequently arranged to also alternately provide heating in accordance with container temperature demands by a hot gas cycle.

Figure 1:
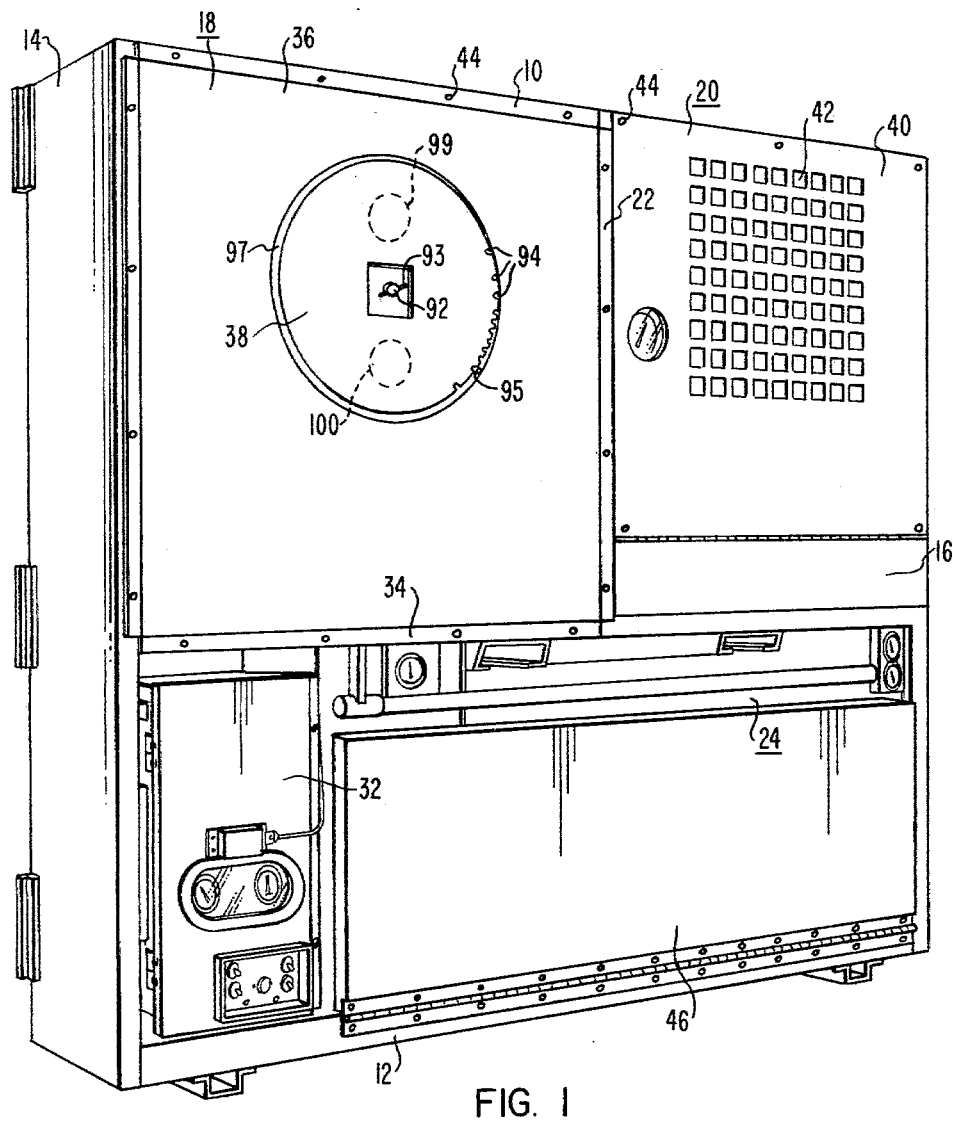
FIG. 1 is a front perspective view of a transport refrigeration unit according to the invention.

In FIG. 1 the transport refrigeration unit according to the invention is shown before mounting on a freight container. The unit has a generally rectangular outer frame formed by top and bottom walls 10 and 12, and opposite side walls 14 and 16. The upper part of the unit is separated into the left side evaporator compartment generally designated 18 (also see FIGS. 2-4) and right side condenser compartment generally designated 20, by the intermediately located, vertically disposed partition 22. The lower part of the unit below the evaporator and condenser compartments is what is herein termed a power compartment generally designated 24 which extends for the width of the unit and contains a power package including an internal combustion engine 26 (FIG. 2) electric motor-alternator 28, and a refrigerant compressor 30, in in-line relation.

The power compartment also contains a power and control module 32 at its left end as seen in FIG. 1. This module contains the electrical elements which control the various operating modes of the unit, and makes reconnections of the electrical circuitry for using either the diesel generated power or that from an electrical source on board ship or at dockside to power the electrical motors and other electrical elements. Reference should be had to U.S. Patent application Ser. No. 79,013, filed 9-26-79, for details.

The power compartment is separated from the evaporator compartment by horizontal partition means 34 which defines the bottom of the evaporator compartment. The bottom of the condenser compartment is in substantially open communication with the power compartment.

The front wall of the refrigeration unit includes one detachable panel means 36 (FIG. 1) for the evaporator compartment, this panel including a rotatable vent plate 38 about which more will be said later, a condenser compartment front panel 40 including an open work grill 42 which serves as the condenser air inlet. In the currently preferred form the evaporator and condenser compartment front panels are separate, and each is fastened along its peripheral margin by removable fasteners 44 so that the panels may be readily detached for service or other purposes. A part of the front of the power compartment is covered by a swing-down panel 46 which permits access to the components behind the panel.

Figure 2:
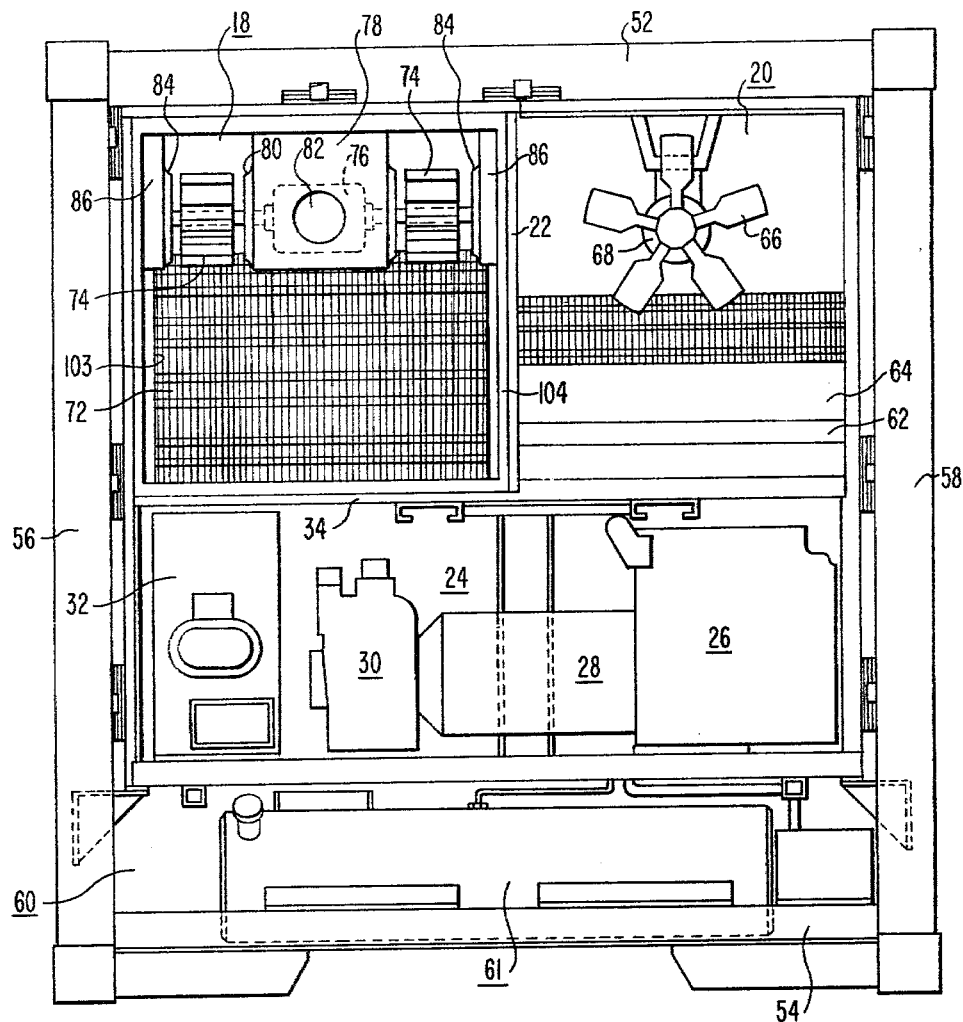
FIG. 2 is a front elevation view of the unit mounted on a container, this view being in the nature of an outline drawing and with front panel means and other parts omitted.
Figure 3:
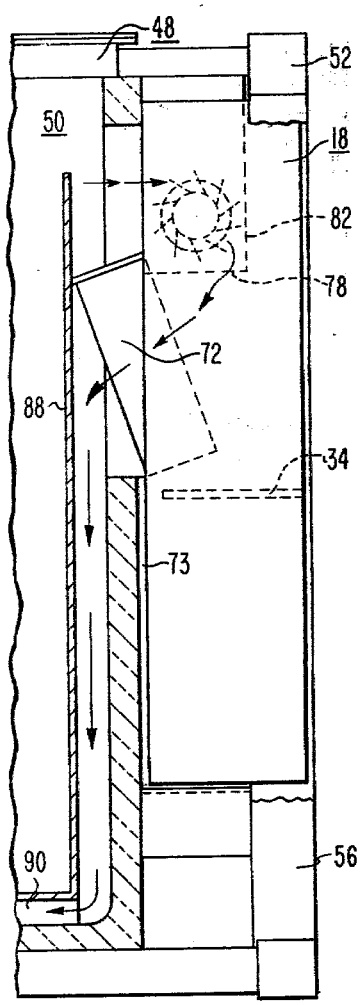
FIG. 3 is a view, mainly in outline, of the unit as mounted on a container and as seen from the left of FIG. 2.
Figure 4:
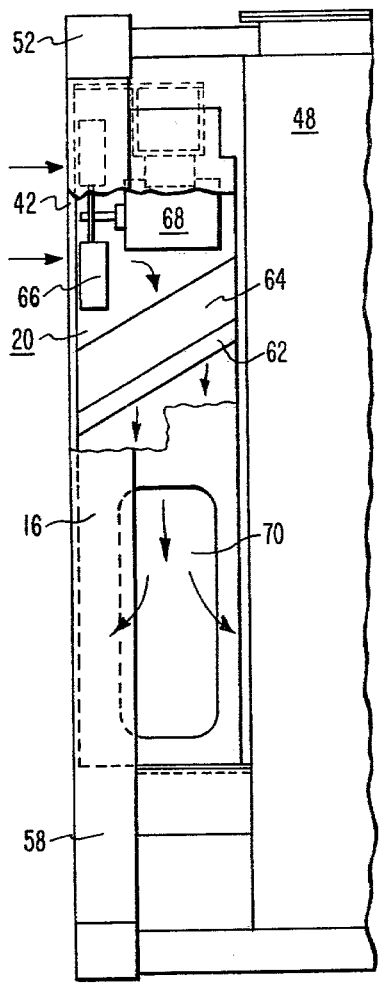
FIG. 4 is a view, mainly in outline, of the unit as seen from the right of FIG. 2 and illustrating the arrangement of the condenser compartment.

Referring to FIGS. 2-4, a fragmentary poriton of the forward end of a freight container 48 is shown in FIG. 3, with the interior space of the container being designated 50 and with the pocket noted before being provided at the front of the container being generally outlined at the front by the members 52, 54, 56, and 58. The refrigeration unit per se occupies substantially the full width of the pocket, and most of the height of the pocket, the space 60 at the bottom of the pocket being available for a fuel tank 61 for the engine 26.

The condenser compartment 20 includes a radiator coil 62 and a refrigerant condenser coil 64, both of conventional fin and tube construction, and disposed in a tilted inclination in the lower part of the condenser compartment as shown in FIG. 4. A propeller type condenser air fan 66 driven by motor 68 is mounted in the upper part of the condenser compartment to draw air in through the open work grill 42 and direct it downwardly through the coils and into the power compartment from whence it exits in part through the opening 70 in the side wall 16, the flow path being as indicated by the arrows in FIG. 4.

Referring to FIGS. 2 and 3, the evaporator compartment 18 contains the refrigerant evaporator coil 72 which is disposed as shown in the tilted inclination with a material portion of the coil in the space forward of the plane 73 of the main part of the rear face of the frame of the refrigeration unit and with the remaining poriton out of the plane of the rear face of the frame. The evaporator fan means for the unit comprises a pair of double inlet centrifugal fans 74 mounted on opposite end shafts of motor 76 which in turn is mounted in a rearwardly-open, partial enclosure 78 which has side walls forming inlet rings 80 for the inner inlets of the two fans. The enclosure 78 also has a front opening 82 to admit a controlled amount of ambient air to the evaporator compartment for fresh air exchange when the vent plate 38 is set at positions other than the fully closed position shown in FIG. 1. The outer inlets of the two fans face open rings 84 formed on the inner side walls of rearwardly open boxes 86.

Air is returned from the refrigerated interior 50 (FIG. 3) of the container 48 from near the ceiling of the container and flows into the upper part of the evaporator compartment through the open rear ends of the boxes 86 and into the open rear of the partial enclosure 78, the air in these three paths being drawn into the fans 74 and discharged downwardly through the evaporator coil 72 from whence it flows downwardly as indicated by the arrows in FIG. 3 in the space between the baffle 88 in the container and the front wall of the container. This air is then directed into channels 90 at floor level of the container to pass rearwardly.

In shipping certain products in a refrigerated container it is desirable to provide an exchange of ambient air with the conditioned air in certain ratios. Accordingly, the unit according to the invention is provided with the vent plate 38 arranged to control the exchange in accordance with its rotative disposition. This plate is rotatably supported from panel 36 by shaft 92 upon which wing nut 93 is turned. The rim of the plate is provided with a number of notches 94 selectively spaced from each other to encompass a given arc. A yieldable pin 95 secured to panel 36 is adapted to be disengaged and re-engaged with the notches to establish the rotative position of the plate and accordingly the ratio of air exchange between the container interior and exterior. The plate is shown in FIG. 1 in the position in which there is no exchange of air and with the pin in the corresponding notch. By disengaging the pin from that notch and rotating to the plate to a position in which the pin is received by the opposite extreme notch the maximum ratio of air exchange is obtained, with rotative positions of the plate between the extremes giving corresponding ratios of air exchange.

Figure 5:
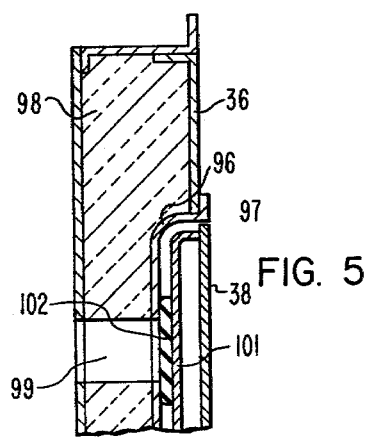
FIG. 5 is a vertical sectional view corresponding to one taken along the line V—V of FIG. 1, with the rotatable vent plate in a position blocking ventilating air.

The path of air flow into the evaporator compartment from outside, and vice versa, is perhaps best understood in connection with FIG. 5, taken with FIGS. 1 and 2. The perimeter of plate 38 is spaced from the periphery of a circular, dished recess 96 so that air flow paths 97 are provided between outside and the space behind the plate. The panel 36, which is of significant depth in that it is filled with thermal insulation 98, has an upper and a lower passage therein at locations as indicated in FIG. 1 by the dash-line circles 99 and 100, respectively, the upper passage alone being shown in FIG. 5. The rear face of the plate 38 carries bracket means 101 extending diametrically and supporting two oppositely disposed resilient circular pads 102 which, when the plate is in its rotative position to close off air exchange, are aligned with and close off the passage 99 and 100. The upper passage 99 of the panel is in alignment with the opening 82 (FIG. 2) of the enclosure 78 so that the air which is admitted into the evaporator compartment in an air exchange condition is pulled in by the evaporator fans.

In an operation in which air is to be exchanged, the plate 38 is rotated to a position which will give the desired ratio of exchange. The fresh air is drawn in through path 97 and upper passage 99 by the fans, while a corresponding amount of air is exhausted through lower passage 100 and path 97 to atmosphere, it being understood that the lower passage is essentially the same as the upper one shown in FIG. 5. Short circuiting of the air behind the plate is essentially avoided by virtue of the bracket means 101 extending diametrically across the back of the plate.

As is shown in FIG. 5, the evaporator compartment panel 36 is provided with thermal insulation 98 of sufficient depth to avoid undue heat transfer from the evaporator compartment through the panel to ambient. Also, the evaporator compartment is provided with a rectangular inner liner 103 which provides a space between it and the facing parts of the frame for thermal insulation (not shown) located in that space. The front face of the space is provided with a gasket 104 (FIG. 2) to promote sealing of the evaporator compartment from atmosphere.

We claim:

1. A transport refrigeration unit adapted to be mounted on the front wall of a transport container for conditioning the interior of the container, comprising:
    a generally rectangular outer frame forming the top, bottom and opposite side walls of the unit;
    intermediately-located, vertically-disposed partition means separating the upper portion of said frame into side-by-side evaporator and condenser compartments;
    partition means defining the bottom of said evaporator compartment;
    a power compartment below said evaporator and condenser compartments and extending for the width of said unit, said power compartment containing a power package including an internal combustion engine, an electric motor-alternator and a refrigerant compressor in in-line relation, said power compartment being in substantially open communication with the bottom of said condenser compartment;
    a radiator coil and a refrigerant condenser coil in said condenser compartment;
    a refrigerant evaporator coil in said evaporator compartment, a material portion of said coil being forward of the plane of the rear face of the frame and the remaining portion projecting out of the plane of the rear face of the frame;
    evaporator fan means in the upper part of said evaporator compartment for moving air to be conditioned into said evaporator compartment from said container interior, through said evaporator coil and back into said container interior;
    condenser fan means in said condenser compartment for creating a flow of air from atmosphere through said condenser and radiator coils, into the power compartment, and back to atmosphere;
    panel means covering the front face of said evaporator and condenser compartments, said panel means including a condenser air inlet for said condenser compartment; and
    thermal insulation insulating the front face of said evaporator compartment.

2. A unit according to claim 1 wherein:
    said evaporator coil is disposed in the lower part of said evaporator compartment in a tilted inclination with the upper edge part projecting out of the plane of the rear face of the frame; and
    said evaporator fan means comprise a pair of double inlet, centrifugal fans drawing air in from the upper part of said container, forcing it through said evaporator coil and downwardly in said container.

3. A unit according to claim 1 wherein:
    said condenser coil and radiator coil are disposed in an inclined disposition; and
    said condenser fan means comprises a propeller fan in the upper part of said condenser compartment located adjacent said condenser air inlet.

4. A unit according to claim 1 wherein:
    both said evaporator fan means and said condenser fan means are driven by separate electric motors receiving power from said alternator when said internal combustion engine is operated, and from a common electrical power source providing power to the electric motor-alternator of the power package when said internal combustion engine is not being operated.

5. A unit according to claim 1 wherein:
    said panel means comprise a separate panel for each of said evaporator and condenser compartments, both said panels being separable from said frame by removal of fasteners to afford independent access to each of said evaporator and condenser compartments.

6. A unit according to claim 5 wherein:
    said evaporator compartment panel includes vent openings for placing said evaporator compartment interior in communication with atmosphere; and
    adjustable means is provided for controlling the exchange of fresh atmospheric air with the air in said evaporator compartment.

7. A unit according to claim 6 including means for indexing said adjustable means to preselected positions to give preselected ratios of air exchange.

* * * * *